April 16, 1963  R. E. DARLING  3,085,660
BRAKE MECHANISM

Filed Feb. 29, 1960  3 Sheets-Sheet 1

RALPH E. DARLING,
INVENTOR.
WHANN & McMANIGAL
Attorneys for Applicant

April 16, 1963 R. E. DARLING 3,085,660
BRAKE MECHANISM

Filed Feb. 29, 1960 3 Sheets-Sheet 2

RALPH E. DARLING,
INVENTOR.
WHANN & McMANIGAL
Attorneys for Applicant

April 16, 1963   R. E. DARLING   3,085,660
BRAKE MECHANISM
Filed Feb. 29, 1960   3 Sheets-Sheet 3

RALPH E. DARLING,
INVENTOR.
WHANN & McMANIGAL
Attorneys for Applicant

United States Patent Office 3,085,660
Patented Apr. 16, 1963

3,085,660
BRAKE MECHANISM
Ralph E. Darling, South Gate, Calif., assignor to Big Five Shoe Brake Corp., Los Angeles, Calif., a corporation of California
Filed Feb. 29, 1960, Ser. No. 11,815
7 Claims. (Cl. 188—78)

This invention relates to certain improvements in brakes, and more particularly to wheel brakes of the internal expanding type operated either mechanically or by fluid pressure.

While the invention has particular utility in connection with wheel brakes for motor vehicles and the like, and as shown and described in such connection, it is to be understood that its utility is not confined thereto.

The most commonly used brakes for heavy duty automotive service have a number of disadvantages among which are that they employ lining of limited circumferential extent, do not wear the lining to good advantage, tend to deflect the brake drum out of round during heavy applications, and often cause the brake drums to expand, from frictional heat, to such an extent as to result in fading or loss of brakes.

It is, therefore, one of the objects of the present invention to provide a brake of the type adapted for heavy duty automotive service in which the above disadvantages are avoided or minimized.

Another object of the invention is the provision of a brake of the character indicated whereby a uniform and equalizing pressure will be imparted to the brake drum throughout its entire movement.

Still another object of the invention is to provide a brake of this character wherein fading or loss of the brakes is eliminated, that is, wherein the loss of brake effectiveness due to expansion of the drum as the result of frictional heating thereof is eliminated.

A further object of the invention is to provide a brake mechanism of this character wherein the brake shoes have greater travel than heretofore so as to compensate for any increase in drum diameters as drums expand under the influence of frictional heat.

A still further object of the invention is to provide a brake mechanism of this character having automatic adjustment means to compensate for the wearing of the brake lining.

Another object of the invention is to provide a brake mechanism which makes possible the use of the maximum circumferential extent of brake lining, which provides highly desirable wearing characteristics and which produces uniform expansion stresses in the brake drum to minimize drum deflection.

Still another object of the invention is to provide a brake mechanism of this character wherein there are a plurality of brake shoes uniformly distributed within the brake drum.

A further object of the invention is to provide a mechanism of this character having floating shoes with large areas.

Still another object of the invention is to provide a brake mechanism of this character wherein the braking elements will be uniformly applied to the braking surfaces of the drums and the wear on the same will be evenly distributed over the entire areas thereof.

Another object of the invention is to provide a brake mechanism of this character which is powerful and at the same time relatively easy to operate.

Still another object of the invention is to provide a brake mechanism of this character which is compact and which is made of comparatively light parts and at the same time is strong and durable.

A further object of the invention is to provide a device of this character that is comparatively simple and inexpensive in construction and arrangement of the parts.

A still further object of the invention is to provide a brake mechanism of this character which can be easily and quickly assembled and disassembled either for original assembly purposes or for repair or replacement in the field.

Other objects and advantages of the invention will be readily apparent to those skilled in the art from the following description taken in connection with the accompanying drawings which represent one embodiment. After considering this embodiment, skilled persons will understand that many variations may be made without departing from the principles disclosed, and I contemplate the employment of any structures, arrangements or modes of operation that are properly within the scope of the appended claims.

Briefly stated, in general terms, the objects of my invention are attained by providing an internally expanding brake comprising a brake drum and a generally circular cam plate disposed inside the drum. The cam plate is provided with a plurality of circumferentially spaced cam surfaces which are characterized in imparting relatively long circumferential movements to brake shoes for corresponding short radial movements of the brake shoes. This characteristic imparts to the brake the unique property of highly sensitive compensation for expansion effects due to heat and for changes in dimensions of parts caused by wear. As a result, the brake of my invention has a long, reliable service life during which the brake lining is applied to the brake drum with uniform equalized pressure. These features are enhanced by the provision of overlapping equalizer tab means at the adjacent ends of the brake shoes to minimize any tendency toward unequal end effects. Fading or loss of the braking effect is eliminated and compensation for wear of the brake lining and drum surfaces is automatic.

A more detailed description of a preferred embodiment of my invention is given below with reference to the accompanying drawings, wherein:

FIG. 3 is a view similar to that of FIG. 1 but taken through the line 3—3 of FIG. 2;

FIG. 4 is a partial view similar to that of FIG. 3 but showing the brake linings in a worn condition and applied to the drum;

Figure 1:
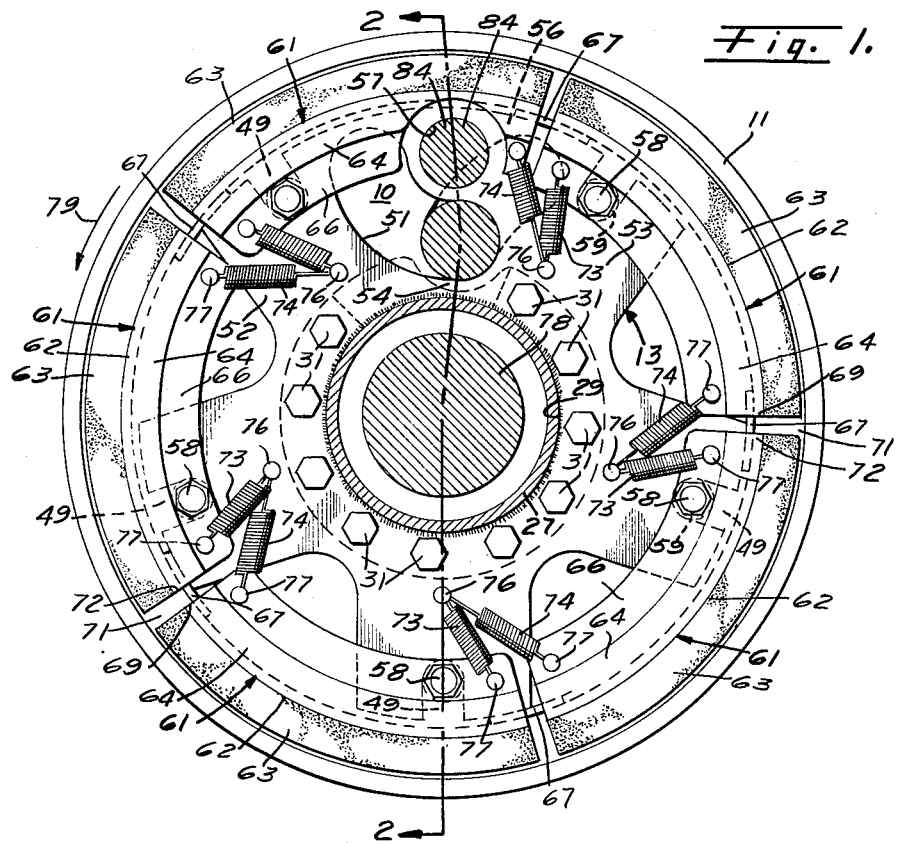
FIG. 1 is a vertical section through the brake assembly along the line 1—1 of FIG. 2.

The cam plate 10 is mounted inside the brake drum 11 between an outer spider plate 12 and an inner spider plate 13. Cam plate 10 is of generally circular shape but is provided with five cam surfaces 14. Each cam surface 14 extends radially inwardly from the circumference of cam plate 10 at a point 16 (FIG. 3) for a short distance at 17, then circumferentially and radially inwardly for a relatively long distance at 18, and finally radially outwardly for a distance at 19 to the circumference at a point 21. The distance at 19 is somewhat deeper than that at 17 and the difference is a measure of the radially outward movement of each cam surface 14 while moving circumferentially from the deeper end of the cam surface at 19 to the shallower end at 17.

The length of cam surface 14 is at least twice the radial outward movement over length or distance 18, preferably from about three to about twelve times as great, and especially about six times as great. Each cam surface 14 preferably is curved slightly with a radius of curvature somewhat less than the radius of the cam plate, but it will be understood that a larger or smaller radius of curvature or a straight cam surface can be used. Between adjacent points 16 and 21 on the circumference of cam plate 10 are five circumferential portions 22.

Cam plate 10 is centrally apertured at 23 and is provided with an involute slot 24 running in a generally radial direction from a circumferential portion 22, as best shown in FIGS. 3 and 4. A projecting portion 26, extending into aperture 23, forms the inner boundary of slot 24. Cam plate 10 is mounted over a hollow cylindrical axle housing 27, having an appreciably smaller outside diameter than the diameter of aperture 23.

Figure 2:
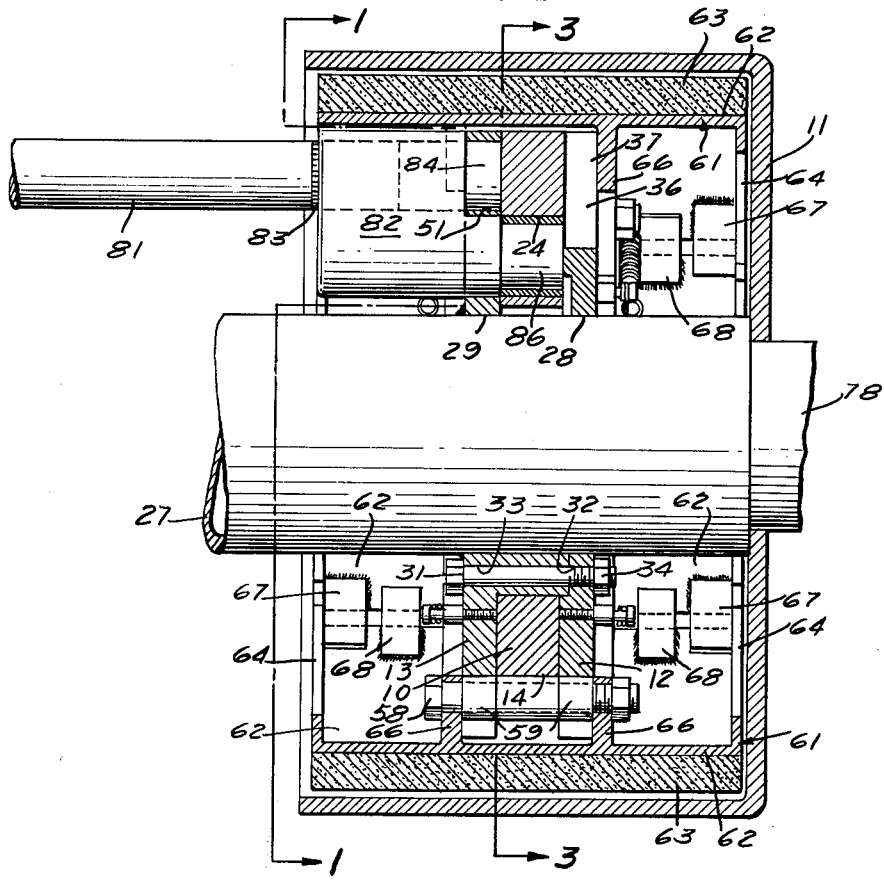
FIG. 2 is a vertical section taken at right angles to that of FIG. 1 and through the line 2—2.
Figure 6:
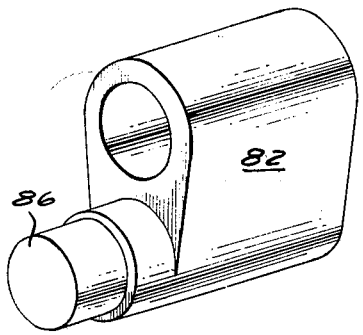
FIG. 6 is a detailed, isometric view showing the crank used to actuate the brake.
Figure 7:
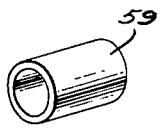
FIG. 7 is a similar view showing a cam follower bearing.

Spider plates 12 and 13 also are mounted over axle housing 27 which passes snugly through aperture 28 of outer spider plate 12 and through aperture 29 of inner spider plate 13. Spider plate 13, as best shown in FIGS. 1 and 2, is fixed to axle housing 27, as by welding, at the circumference of aperture 29 and the adjoining surface of the housing. A plurality of bolts 31 pass through holes 32 and 33 drilled through spider plates 12 and 13, respectively, and with the aid of fastening nuts 34 maintain the two spider plates in fixed relationship with respect to each oher and, in turn, with axle housing 27. Cam plate 10, however, is not held fixed with relationship to the spider plates 12 and 13 or axle housing 27, but is rotatably slidable between the spider plates and around the axle housing.

Outer spider plate 12, as best shown in FIG. 3, is of generally circular shape and is provided with five angular notches 36 having straight sides 37 and 38 and rounded apexes 39. Between the notches 36 are formed five guide legs 41, each carrying a radial guide slot 42. Each radial guide slot 42 has parallel spaced radial sides 43 and 44 and a rounded inner end 46, as best shown in FIG. 4. As a result, the guide legs 41 are of bifurcated shape wherein each prong thereof ends in circumferential edges 47 and 48, respectively.

Inner spider plate 13 is similar in structure to outer spider plate 12 in having five similarly shaped and similarly spaced guide slots 49, as best shown in FIG. 1, but differs structurally from outer plate 12 in containing an involute slot 51 between guide portions 52 and 53 joined by an inner web portion 54 and an outer web portion 56. Also positioned between guide portions 52 and 53 is a circular aperture 57.

Figure 5:
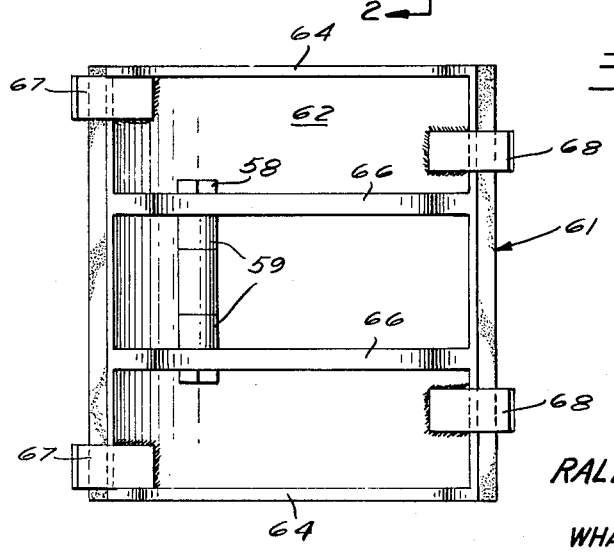
FIG. 5 is a plan view showing the inner side of a brake shoe.

Guide slots 42 and 49 of spider plates 12 and 13, respectively, are aligned to receive five screws 58 each provided with a cam follower bearing 59. Each of the cap screws 58 is mounted in a brake shoe 61, as best shown in FIGS. 2 and 5. Each brake shoe 61 is provided with an arcuate shoe portion 62 to which is suitably attached a section of brake lining 63. Arcuate side flanges 64 are formed integrally with the shoe portion 62 as well as spaced arcuate lugs 66. The spacing of lugs 66 is made such that the lugs fit snugly against the guide legs 41 of spider plate 12 and the corresponding guide legs of spider plate 13, respectively, as best shown in FIG. 2. Each brake shoe 61 is provided with two front equalizer tabs or sections 67 and two rear equalizer tabs or sections 68. The tabs 67 and 68 are attached to the inner side of shoe portion 62 of each shoe 61 by welding so that about half of the tabs extend beyond the front or rear edge thereof. Other suitable means or manner of attachment of the tabs 67 and 68 can be used and, if desired, the tabs can be made integral sections of shoe portions 62.

When the brake shoes 61 are mounted circumferentially inside brake drum 11, and on spider plates 12 and 13, with cam follower bearings 59 in the guide slots 42 and 49 of the spider plates, the front end 69 of each shoe is spaced a short distance 71 from the rear end 72 of the adjacent shoe. The front and rear tabs 67 and 68, respectively, are made to overlap or project a sufficient distance beyond the edges of each shoe 61 to extend at all times beyond the adjacent edges of the adjacent shoes, as best shown in FIGS. 1 and 2, and to tightly engage the under side of the shoe portions 62 of such adjacent shoes. In this manner the tabs 67 and 68 at all times maintain the shoes 61 and brake linings 63 in equalized, circular alignment against any forces or pressures tending to urge the end portions of the shoes and brake linings out of equalized alignment with the major portions thereof. Mounted brake shoes 61 are urged radially inwardly by groups of springs 73 and 74, having inner ends thereof attached to spider plates 12 and 13, respectively, at spring pins 76, and to brake shoes 61 at spring pins 77, as best shown in FIG. 1.

The position or location of the cam follower bearings 59 relative to the other portions of the respective brake shoes is important. Since the brake shoes are all of the same construction, a description of the position of the roller or bearing 59 of one of the shoes will be sufficient.

The axis of the screw 58 and hence the bearing or roller 59 is on a radius which intersects the arcuate shoe portion 62 at a point substantially one-fourth the length of said arcuate portion 62 from the trailing end thereof. Thus, approximately one-fourth arcuate portion 62 is at the trailing end of the arcuate portion 62 of the shoe and, hence, is at the trailing side of the above referred to intersecting radius, and three-fourths of said shoe portion 62 is at the leading side of said radius.

The axis of said screw 58 and bearing or roller 59 is also adjacent the chord extending from end-to-end of the arcuate portion 62.

With this arrangement, when the brake is applied, there is a slow initial application of the brake with a self-energizing action. The tabs at the ends of the shoes aid in providing these actions and also maintain the brake shoes in proper alignment relative to each other and insure equalized application of braking pressure.

In connection with the location of the roller 59 relative to the arcuate part 62 of the brake shoe both lengthwise and radially thereof, said roller should be approximately as above described. However, if the roller is positioned closer to the trailing end of the shoe portion 62 it should be spaced further therefrom radially and vice versa.

Brake drum 11 is connected to an axle 78 which passes concentrically through axle housing 27. The rotation of axle 78 can be retarded or stopped when brake drum 11 is turning in the direction of arrow 79 by turning cam plate 10 also in the direction of arrow 79. Upon turning cam plate 10 in such direction, the cam surfaces 14 move from the position shown in FIG. 3, where the brake is shown in the unapplied or off position and the brake linings 63 are shown in an unworn condition, to the position shown in FIG. 4, where the brake is shown in the applied or on position and showing the brake linings in a worn condition. It will be seen that as the brake is applied by turning cam plate 10 through the relatively long distance equivalent to an appreciable portion of the length of cam surfaces 14; i.e., portion 18, the cam follower bearings 59 and cap screws 58 move radially outwardly a short distance equivalent to only a part of the difference between the radii at the two ends of the cam surface; i.e., only about one-twelfth to about one-half, and preferably only one-sixth of the distance 18. This feature gives rise to a high mechanical advantage, or leverage, so that a relatively small turning force can be applied to cam plate 10 to apply a relatively high outwardly urging force upon cam follower bearings 59 and, in turn, to brake shoes 61 and brake linings 63. In addition, this feature results in a high degree of sensitivity or positive response of the brake shoes 61 to relatively slight differences in the activating forces applied to the brake. Furthermore, as the brake lining wears from the relatively new or unworn condition shown in FIG. 3 to the relatively old or worn condition shown in FIG. 4, the cam follower bearing travels a relatively longer distance along cam surface 14 and a relatively greater distance radially outwardly before the worn brake linings 63 fully engage brake drum 11. This wear of the brake lining 63 and of the inside of brake drum 11 are automatically compensated for by the additional travel of cam plate 10, cam surfaces 14, bearings 59 and brake shoes 61.

Any suitable mechanical pneumatic or hydraulic means can be used to actuate the brake of my invention. For illustrative purposes a mechanical arrangement is shown consisting of a rotatably mounted shaft 81 splined into engagement with a crank 82 at 83. A short connecting shaft section 84 rotatably mounts the crank 82 in aperture 57 of spider plate 13. A lower projecting shaft 86 of crank 82 extends through an involute slot 51 of spider plate 13 and into involute slot 24 in cam plate 10. The cam plate 10 is turned in the direction of arrow 79 to apply the brake by suitably turning shaft 81 and crank 82.

As the brake is applied it sensitively compensates automatically for wear on the brake drum and linings and for expansion effects due to heating of the brake drum and other parts. Thus the brake of my invention has a long and reliable service life during which the brake lining is always applied to the brake drum with uniform, equalized pressure. The overlapping equalizer tabs 67 and 68 additionally insure that the brake linings will be applied to the brake drum with uniform, equalized pressure from one end of the brake lining to the other.

I claim:

1. A brake mechanism comprising: a rotatable brake drum; a rotatably mounted cam plate disposed inside the drum; a plurality of re-entrant circumferential cam surfaces formed on the cam plate; a spider plate positioned on each side of the cam plate, said spider plates being fixed in relationship to each other and being fixed relative to the rotation of the brake drum; re-entrant guide portions formed in aligned relationship on the spider plates; brake shoes fitted for radial movement in said drum generally outwardly of said cam plate; roller means on said shoes extending into said guide portions; cam follower means extending axially from said roller means in alignment with said guide portions, said cam follower means operatively associated with said cam surfaces; and means for applying the brake by rotating said cam plate.

2. In a brake mechanism of the internally expanding type: a rotatable brake drum; a rotatably mounted cam plate disposed inside the drum; a plurality of cam surfaces on the cam plate, each of said cam surfaces having a re-entrant circumferential portion and radially extending end portions; a spider plate positioned on each side of the cam plate, said spider plates being fixed in relationship to each other and being fixed relative to the rotation of the brake drum; re-entrant guide portions formed in aligned relationship on the spider plates; brake shoes fitted for radial movement in said drum generally outwardly of said cam plate; roller means on said shoes extending into said guide portions; cam follower means extending axially from said roller means in alignment with said guide portions, said cam follower means operatively associated with said cam surfaces; each brake shoe having an arcuate outer surface for engagement with said drum upon application of the brake mechanism, said cam follower means having its axis on a radius which intersects an arcuate portion adjacent the trailing end thereof, the axis of said cam follower means also being adjacent the chord of the arcuate portion extending between the respective ends of said arcuate portions; projection means on each of the brake shoes and unattachably overlapping adjacent brake shoes for retaining shoes in alignment relative to each other; and means for rotating said cam means to effect actuation of said brake shoes.

3. A brake mechanism, comprising: a rotatable brake drum; a rotatably mounted cam plate disposed inside the drum; a plurality of cam surfaces formed on the cam plate and including re-entrant circumferential components; a spider plate positioned on each side of the cam plate; said spider plates being fixed in relationship to each other and being fixed relative to the rotation of the brake drum; guide portions formed in aligned relationship on the spider plates; brake shoes fitted for radial movement in said drum generally outwardly of said cam plate; means on said shoes extending therefrom and extending in the guide portions; cam follower means positioned on said last means and operatively associated with the cam surfaces; projection means on each of the brake shoes and overlapping adjacent brake shoes for retaining said shoes in a precise circular alignment; and means for rotating said cam plate to thereby effect application of the brake shoes to the brake drum.

4. A brake mechanism, comprising: a rotatable brake drum; a rotatably mounted cam plate disposed inside the drum; a plurality of cam surfaces on the cam plate, each of said cam surfaces including a surface having a circumferential component and a radially outwardly directed component, the circumferential component being about three to twelve times as long as said radially outwardly directed component; a spider plate positioned on each side of the cam plate, said spider plates being fixed in relationship to each other and being fixed relative to the rotation of the brake drum; guide portions formed in aligned relationship on the spider plates; brake shoes fitted for radial movement in said drum generally outwardly of said cam plate; means secured to said shoes and extending into said guide portions; cam follower means positioned coaxially of said last means in alignment with said guide portions, said cam follower means operatively associated with said cam surfaces; projection means on each of the brake shoes and overlapping adjacent brake shoes to equalize the pressure of the shoes on the drum when the braking application is made; and means for applying the brake by rotating said cam plate.

5. In a brake of the internally expanding type: rotatably mounted cam means; a plurality of cam surfaces on the cam means, each of said cam surfaces including a re-entrant circumferential component of substantial length; brake shoe means for each cam surface, each brake shoe means including an arcuate portion, elongate means secured to said brake shoe means for guiding movement of said brake shoe means, and a cam follower positioned coaxially of said elongate means, said elongate means having its axis on a radius of the brake mechanism which intersects the arcuate portion at a point approximately one-fourth the length of said arcuate portion measuring from the trailing end thereof, the axis of said elongate means also being adjacent the chord of the arcuate portion extending between the respective ends of said arcuate portion; projection means on each of the brake shoes and overlapping adjacent brake shoes for retaining said shoes in alignment relative to each other; and means for applying the brake by rotating said cam means.

6. In a brake of the internally expanding type; rotatably mounted cam means; a plurality of cam surfaces on the cam means, each of said cam surfaces including a re-entrant circumferential component; brake shoe means for each cam surface, each brake shoe means including an arcuate portion, elongate means secured to said brake shoe means for guiding movement of said brake shoe means, and a cam follower positioned coaxially of said elongate means, said elongate means having its axis on a radius of the brake mechanism which intersects the arcuate shoe portion adjacent the trailing end thereof, the axis of said elongate means also being adjacent the chord of the arcuate portion extending between the respective ends of said arcuate portions; and means for applying the brake by rotating said cam means.

7. In a brake mechanism of the internally expanding type having a brake drum: rotatably mounted cam means; a plurality of cam surfaces on the cam means, each of said cam surfaces including a re-entrant circumferential component; brake shoe means for each cam surface, each brake shoe means including an arcuate portion having a lining engageable with said drum upon application of the brake mechanism, elongate means secured to said brake shoe means for guiding movement of said brake shoe means, and a cam follower positioned coaxially of said elongate means, said elongate means having its axis on a radius which intersects said arcuate portion adjacent the trailing end thereof, the axis of said elongate means also being adjacent the chord of the arcuate portion extending between the respective ends of said arcuate portions; projection means on each of the brake shoes and unattachably overlapping adjacent brake shoes for retaining said shoes in alignment relative to each other; and means for rotating said cam means to effect actuation of said brake shoes.

References Cited in the file of this patent

UNITED STATES PATENTS

| | | |
|---|---|---|
| 1,665,538 | Ellis | Apr. 10, 1928 |
| 2,155,089 | Hunyady | Apr. 18, 1939 |
| 2,167,297 | Fitts | July 25, 1939 |
| 2,630,198 | Kraft | Mar. 3, 1953 |
| 2,862,580 | Burnett | Dec. 2, 1958 |

FOREIGN PATENTS

| | | |
|---|---|---|
| 637,758 | France | Feb. 7, 1928 |
| 792,178 | France | Oct. 14, 1935 |
| 604,060 | Great Britain | June 28, 1948 |